(12) United States Patent
Utsunomiya

(10) Patent No.: US 11,818,309 B2
(45) Date of Patent: Nov. 14, 2023

(54) INPUT DEVICE AND IMAGE FORMING APPARATUS

(71) Applicant: CANON KABUSHIKI KAISHA, Tokyo (JP)

(72) Inventor: Takehito Utsunomiya, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/368,448

(22) Filed: Jul. 6, 2021

(65) Prior Publication Data

US 2021/0337077 A1     Oct. 28, 2021

Related U.S. Application Data

(63) Continuation of application No. PCT/JP2020/005010, filed on Feb. 4, 2020.

(30) Foreign Application Priority Data

Feb. 5, 2019 (JP) ................................ 2019-018766

(51) Int. Cl.
  *G06F 3/12*   (2006.01)
  *H04N 1/00*   (2006.01)
  *G09B 21/00*  (2006.01)

(52) U.S. Cl.
  CPC ....... *H04N 1/00493* (2013.01); *G09B 21/003* (2013.01); *H04N 1/0049* (2013.01);
  (Continued)

(58) Field of Classification Search
  CPC .......... H04N 1/00493; H04N 1/00384; H04N 1/00403; H04N 1/00411; H04N 1/0049;
  (Continued)

(56) References Cited

U.S. PATENT DOCUMENTS 5,493,365 A    2/1996  Matsui
8,352,763 B2   1/2013  Imine et al.
(Continued)

FOREIGN PATENT DOCUMENTS

JP    7-99553 A      4/1995
JP    2001-89016 A   4/2001
(Continued)

OTHER PUBLICATIONS

Japanese Office Action dated Oct. 26, 2021 during prosecution of related Japanese application No. 2020-015973 (English translation included).

(Continued)

*Primary Examiner* — Moustapha Diaby
(74) *Attorney, Agent, or Firm* — VENABLE LLP (57) ABSTRACT

An input device is mountable on an image forming apparatus including a display portion capable of displaying information and is a numerical key unit 70 at least including a numerical key portion 110 consisting of a hardware key capable of inputting information on a numerical value and a start key 131 consisting of a hardware key capable of inputting information for starting predetermined processing. The start key 131 is disposed on a front side F than the numerical key portion 110 in a state in which the numerical key unit 70 is mounted on the image forming apparatus.

18 Claims, 5 Drawing Sheets

(52) U.S. Cl.
CPC ..... *H04N 1/00384* (2013.01); *H04N 1/00403* (2013.01); *H04N 1/00411* (2013.01); *H04N 1/00496* (2013.01); *H04N 1/00557* (2013.01); *H04N 1/00559* (2013.01); *H04N 2201/0081* (2013.01); *H04N 2201/0093* (2013.01); *H04N 2201/0094* (2013.01)

(58) Field of Classification Search
CPC .......... H04N 1/00496; H04N 1/00557; H04N 1/00559; H04N 2201/0081; H04N 2201/0093; H04N 2201/0094; G09B 21/003

See application file for complete search history.

(56) References Cited

U.S. PATENT DOCUMENTS

| | | | |
|---|---|---|---|
| 8,648,820 B2 | 2/2014 | Sensu | |
| 9,285,725 B2 | 3/2016 | Nakabayashi | |
| 2007/0061150 A1* | 3/2007 | Sawano | G07C 9/37 704/275 |
| 2008/0144077 A1* | 6/2008 | Ahmed | G06F 3/1205 358/1.15 |
| 2008/0243624 A1* | 10/2008 | Perry | G06Q 50/12 705/15 |
| 2010/0053676 A1* | 3/2010 | Sugimoto | G06F 3/0238 358/1.15 |
| 2010/0070976 A1* | 3/2010 | Bessho | H04N 1/32122 715/771 |
| 2010/0134244 A1* | 6/2010 | Yoshida | G07C 9/33 340/5.81 |
| 2011/0128247 A1* | 6/2011 | Sensu | G06F 3/0227 345/173 |
| 2016/0021267 A1* | 1/2016 | Jung | H04N 1/00496 399/81 |
| 2017/0353617 A1 | 12/2017 | Kainuma | |
| 2020/0076966 A1* | 3/2020 | Shimadate | H04N 1/00408 |

FOREIGN PATENT DOCUMENTS

| | | | |
|---|---|---|---|
| JP | 2005-257973 | A | 9/2005 |
| JP | 2006-239869 | A | 9/2006 |
| JP | 2010-68026 | A | 3/2010 |
| JP | 2010-134356 | A | 6/2010 |
| JP | 2010-147998 | A | 7/2010 |
| JP | 2011-118584 | A | 6/2011 |
| JP | 2012-156579 | A | 8/2012 |
| JP | 2014-22927 | A | 2/2014 |
| JP | 2014-89333 | A | 5/2014 |
| JP | 2015-212903 | A | 11/2015 |
| JP | 2017-97553 | A | 6/2017 |

OTHER PUBLICATIONS

U.S. Appl. No. 17/387,677, filed Jul. 28, 2021 by Utsunomiya Takehito et al.

PCT International Search Report dated Apr. 7, 2020 in corresponding PCT Application No. PCT/2020/005010 (English translation included).

Japanese Office Action dated Jul. 27, 2021 during prosecution of related Japanese application No. 2020-015973 (English translation included).

European Search Report dated Oct. 6, 2022 during prosecution of related EP application No. 20752388.7.

European Search Report dated Jul. 25, 2023 during prosecution of related EP application No. 20752388.7.

* cited by examiner

INPUT DEVICE AND IMAGE FORMING APPARATUS

This application is a continuation of International Application No. PCT/JP2020/005010, filed Feb. 4, 2020, which claims priority to Japan 2019-018766, filed on Feb. 5, 2019, the contents of each of which are incorporated by reference herein.

TECHNICAL FIELD

The present invention relates to an input device including a hardware key and to be externally attached to an image forming apparatus and to the image forming apparatus to which this input device is externally attached.

BACKGROUND ART

Conventionally, for example, an image forming apparatus of an electrophotographic type has been widely used as a copying machine, a printer, a facsimile (machine), a multi-function machine having a plurality of functions of these (machines), and the like. In such an image forming apparatus, in order to permit a user to perform input of numerical values such as the number of image formed sheets and a facsimile number or input of processing such as a start, a stop, or the like of image forming processing, for example, an operating portion (display portion) capable of displaying and inputting information on a front side upper portion of an apparatus main assembly is provided. As such an operating portion, for example, one provided with a touch panel where input keys (software keys) are displayed on a display screen and with hardware keys such as numerical keys, a start key, and a stop key has become widespread. The hardware keys are, for example, disposed adjacent to the touch panel.

In recent years, for example, upsizing of the touch panel has advanced for the reason that a numerical key portion comprised of software keys is displayed on the touch panel or the like reason, so that downsizing of the operating portion has been desired. Therefore, an input device capable of realizing input of all pieces of information by using only the touch panel without providing the numerical key portion and the start key which are comprised of the hardware keys has been developed (Japanese Laid-Open Patent Application (JP-A) 2011-118584). In this input device, in general, the information is capable of being inputted only by the touch panel, but in accordance with user's desire, as an option, an external input device (for example, a numerical key unit) including a numerical key portion comprised of hardware keys is made connectable.

Problem to be Solved by the Invention

However, in the image forming apparatus described in JP-A 2011-118584, in the input device connectable as the option and including the hardware keys, on a right(-hand) side of the numerical key portion, a start key capable of inputting an instruction for starting image formation or facsimile transmission is provided. For this reason, for example, a user inputs the number of sheets of copy or a designation number (telephone number/FAX number) from the numerical key portion of the input device by his (her) right hand while looking at display on the touch panel, and thereafter there is a need that the user moves his (her) right hand toward a right side when the user presses down the start key. That is, user's operation is required to be moved in a direction in which the user's operation is left from the touch panel, so that the user cannot perform a smooth operation while looking at the display of the touch panel and an operating property was poor.

It is an object of the present invention to provide an input device capable of improving the operating property in the input device for external attachment including the numerical key portion and the start key which are comprised of the hardware keys and to provide an image forming apparatus on which this input device is mounted.

Means for Solving the Problem

The input device of the present invention is mountable on an image forming apparatus including a display portion capable of displaying information and is an input device at least including a numerical key portion consisting of a hardware key capable of inputting information on a numerical value and a start key consisting of a hardware key capable of inputting information for starting predetermined processing, and the start key is disposed on a front side than the numerical key portion in a state in which the input device is mounted on the image forming apparatus.

Effect of the Invention

According to the present invention, it is possible to improve the operating property in the input device for external attachment including the numerical key portion and the start key which are comprised of the hardware keys.

EMBODIMENTS FOR CARRYING OUT THE INVENTION

In the following, an embodiment of an image forming apparatus which is an example of the present invention will be specifically described with reference to FIGS. 1 to 5. Incidentally, in this embodiment, as shown in each of the figures, toward an image forming apparatus 1, a front side is represented by a front side F, a rear side (rear) is represented by a back side B, a left(-hand) side is represented by L, a right(-hand) side is represented by R, an upper (upward) side is represented by U. and a lower (downward) side is represented by D.

In this embodiment, as an example of the image forming apparatus 1, a full-color printer of a tandem type is described. However, the present invention is not limited to one mounted on the image forming apparatus 1 of the tandem type but may also be one mounted on an image forming apparatus of another type, and further, the present invention is not limited to one for a full-color image, but may also be one for a monochromatic image or for a mono-color (single color) image. Or, the present invention can be carried out in various uses, such as printers, various printing machines, copying machines, facsimile machines and multi-function machines.

<Image Forming Apparatus>

Figure 1:
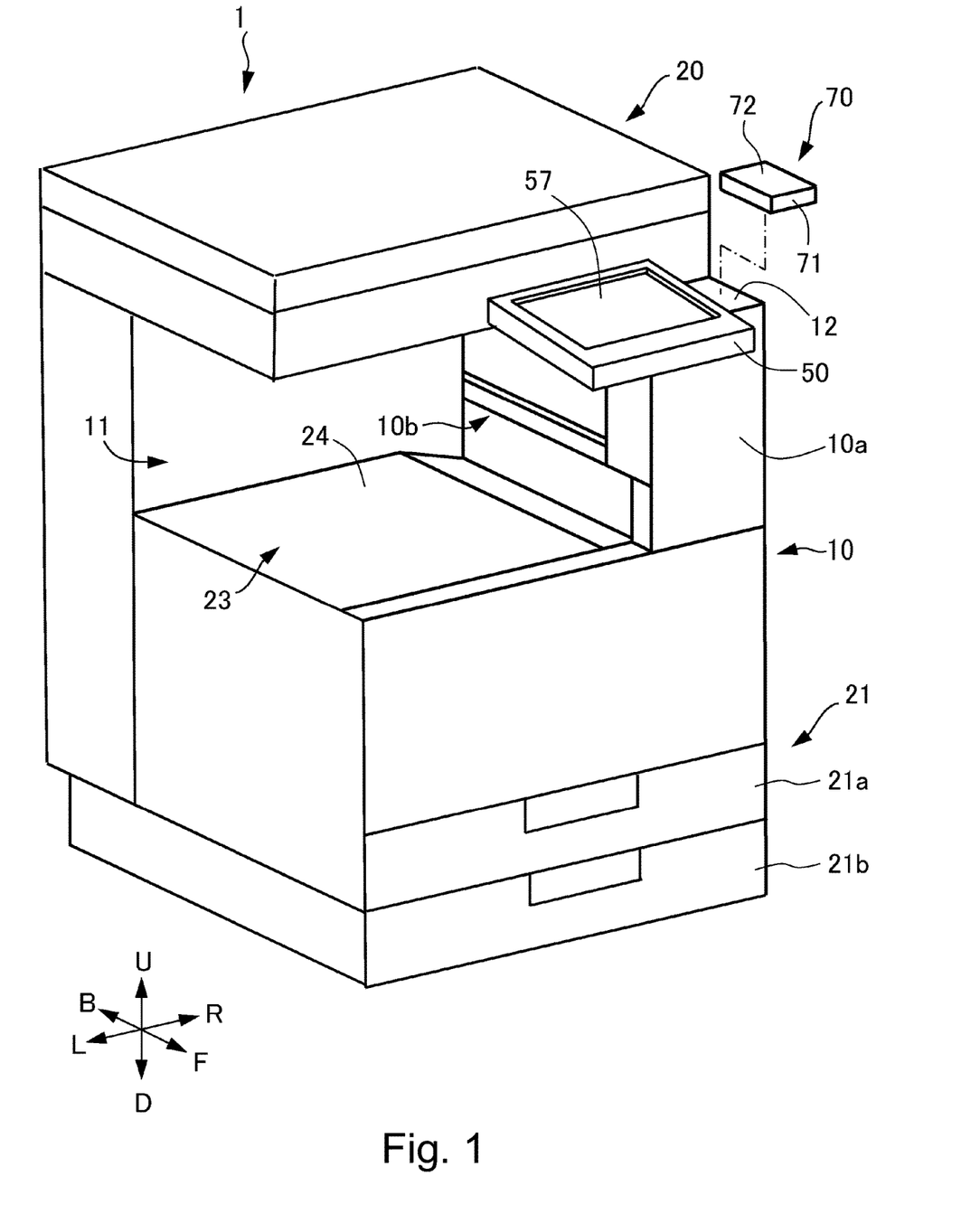
FIG. 1 is a perspective view showing a schematic structure of an image forming apparatus according to this embodiment.

As shown in FIG. 1, the image forming apparatus of this embodiment includes an image forming apparatus main assembly (hereinafter, referred to as an apparatus main assembly) 10. The apparatus main assembly 10 includes an image reading portion 20, a sheet feeding portion 21, an image forming portion 22 (see FIG. 2), a sheet discharging portion 23, a controller 30 (see FIG. 2) and an operating portion 50. Incidentally, on the sheet as a recording material, a toner image is to be formed, and specific examples of the sheet may include plain paper, a resin-made material sheet as a substitute for the plain paper, thick paper, a sheet for an overhead projector, and the like.

The image reading portion 20 is, for example, a flat head scanner device, and is provided at an upper portion of the apparatus main assembly 10. The image reading portion 20 includes an unshown platen glass as an original mounting table, an unshown light source for irradiating an original, placed on the platen glass, with light, and an unshown image sensor for converting reflected to light into a digital signal, and the like member. The sheet feeding portion 21 is disposed at a lower portion of the apparatus main assembly 10, and includes sheet cassettes 21a and 21b for stacking and accommodating the sheet such as recording paper, and feeds the sheet to the image forming portion 22 (see FIG. 2).

The image forming portion 22 is provided inside the apparatus main assembly 10 and includes image forming units each including an unshown developing device and an unshown photosensitive drum as an image bearing member, toner bottles, an intermediary transfer unit, a secondary transfer portion, a fixing device, and the like. The image forming portion 22 is capable of forming an image on the sheet (recording medium) fed from the sheet feeding portion 21, on the basis of image information from a controller 30. The sheet discharging portion 23 includes a discharging tray 24 provided on a side downstream of a discharge opening 10b formed in the apparatus main assembly 10. The discharge tray 24 is a face-down tray, and the sheet discharged through the discharge opening 10b is stacked on the discharge tray 24. Further, a space between the image reading portion 20 and the discharge tray 24 constitutes an in-body space portion 11.

<Controller>

Figure 2:
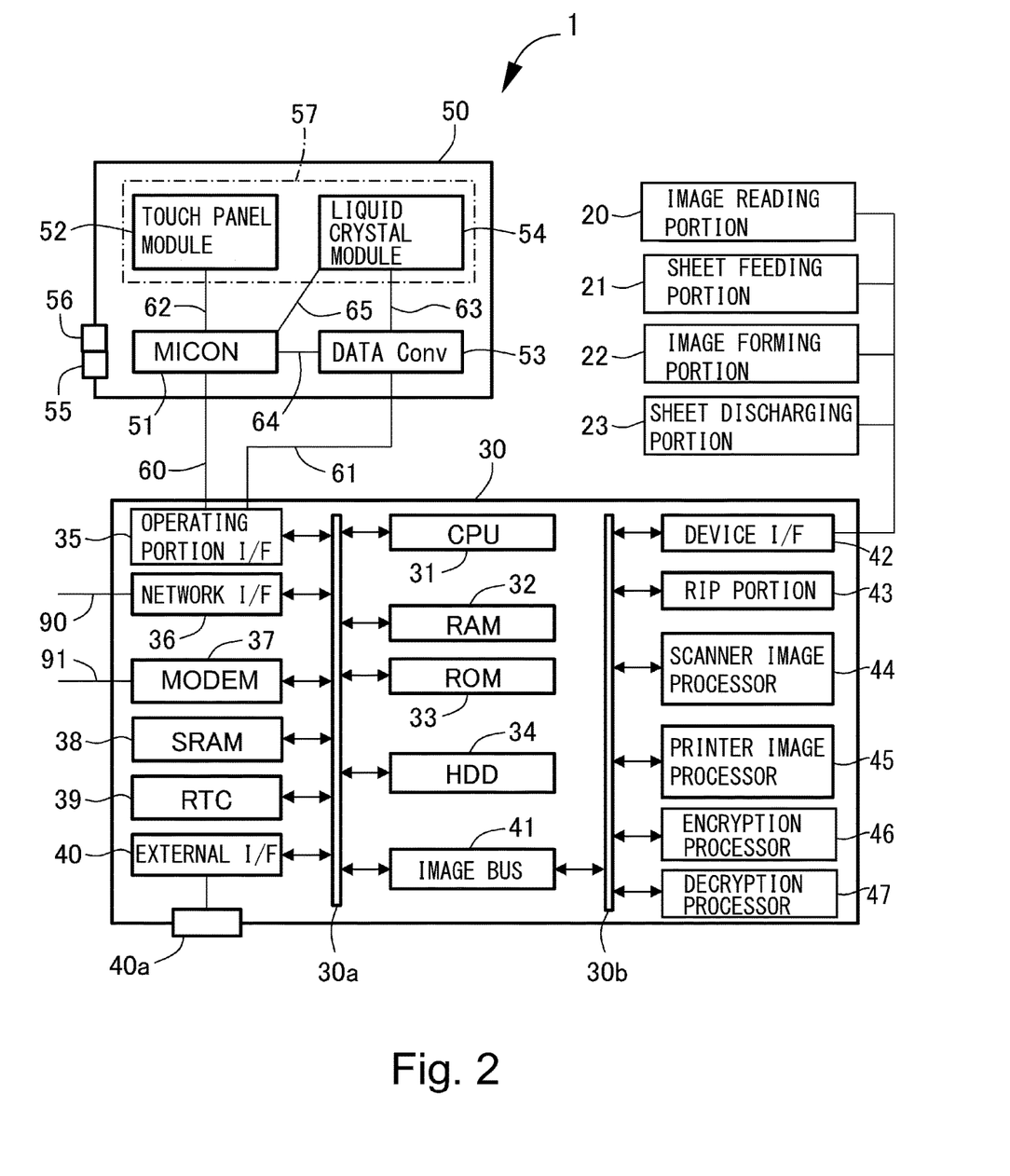
FIG. 2 is a control block diagram of the image forming apparatus according to the embodiment.

As shown in FIG. 2, the controller 30 is constituted by a computer, and for example, includes a CPU 31, a RAM 32 for temporarily storing data, a ROM 33 for storing a program for controlling respective portions, and an HDD 34. In this embodiment, the controller 30 includes a system bus 30a and an image bus 30b, and each of the CPU 31, the RAM 32, the ROM 33, and the HDD 34 is connected to the system bus 30a. The CPU 31 is a processor for carrying out integrated control of a entirety of the image forming apparatus 1 and is a main body of a system controller. The CPU 31 carries out, for example, image processing of image data for image formation and carries out network control, and in addition, controls image forming processing by outputting an instruction of image formation to the image forming portion 22.

The RAM 32 is a system work memory for operating the CPU 31 and is also an image memory for temporarily storing the image data, and functions as a main memory, a work area, and the like of the CPU 31. In the RAM 32, setting information in the image forming apparatus 1, and a job log and an operation log when respective processes are performed are stored. In the ROM 33, an image formation control sequence or the like for forming an image on a sheet is stored. In this embodiment, the ROM 33 is, for example, a boot ROM and stores a boot program of a system. The HDD 34 is a hard disk drive and stores a system software, an application, the image data, and the like.

The controller 30 includes an operating portion input/output circuit (I/F) 35, a network input/output circuit (I/F) 36, a modem 37, an SRAM 38, an RTC 39, and an external input/output circuit (I/F) 40, which are each connected to the system bus 30b. The operating portion input/output circuit (I/F) 35 not only carries out transmission of the image data to an operating portion 50 described later and various communications from the operating portion 50 but also inputs, to the CPU 31, information inputted from the operating portion 50 by a user.

The network input/output circuit 36 is connected to a network 90 and carries out input/output of the information. Further, the modem 37 is connected to a public line (network) 91 and functions as a facsimile communication portion capable of transmitting and receiving facsimile, and carries out input/output of the information. By this, the controller 30 is capable of communicating with another PC and server, connected thereto, via the network 90 by the network input/output circuit 36 or via the public line 91 by the modem 37 under instruction of the CPU 31. That is, the image forming apparatus 1 is connected to the network 90 or the public line 91, and carries out input/output of image information and device information.

The SRAM 38 is a nonvolatile storing medium capable of high-speed operation. The RTC 39 is a real time clock, and performs processing in which a current time is continuously counted even in a state in which power is not supplied to the controller 30. The external input/output circuit 40 is a general-purpose input/output circuit such as Universal Serial bus (hereinafter referred to as USB) and connects a general-purpose PC, a memory device, and a numerical key unit 70 described later via a connector 40a comprised of a USB connector. Incidentally, the connector 40a can be provided, for example, on a side surface or a front surface in the neighborhood of an installation surface 12, described later, where the numerical key unit 70 is installed, or on a side surface of the operating portion 50.

The controller 30 includes an image bus input/output circuit (I/F) 41. The image bus input/output (I/F) 41 is a bus bridge which connects the system bus 30a and the image bus 30b transferring the image data at high speed and which converts a data structure. The image bus 30b is constituted by, for example, a PCI bus or an IEEE 1394.

The controller 30 includes a device input/output circuit (I/F) 42, a RIP portion 43, a scanner image processing portion 44, an printer image processing portion 45, an encryption processing portion 46, and a decryption processing portion 47, which are each connected to the image bus 30b. The device input/output circuit 42 connects the image reading portion 20 and the image forming portion 22 to the controller 30 and performs a synchronous line and a non-synchronous line of the image data. The RIP portion 43 is a raster image processor and develops PDL data into a bit-mapped image. The scanner image processing portion 44 performs correction, processing and editing of the image data. The printer image processing portion 45 subjects print output image data to printer correction, resolution conversion, and the like. The encryption processing portion 46 subjects input data including the image data to encryption processing. The description processing portion 47 subjects encrypted data to description processing.

<Operating Portion>

Next, an example of a hardware constitution for controlling respective pieces of software of the operating portion (display portion) 50 will be described. The operating portion 50 includes a micon 51, a touch panel module 52, a data converter (Conv) 53, and a liquid crystal module 54. The operating portion 50 is connected to the controller 30 by a serial bus 60 for establishing communication with the CPU 31 and by a bus 61 for transferring data for being displayed on the liquid crystal module 54.

The micon 51 is a microcomputer for carrying out integrated control of entirety of the operating portion 50. Inside the micon 51, a ROM in which a program for operating the micon 51 is stored is mounted. The touch panel module 52 is disposed on a surface of the liquid crystal module 54, and by user's touch, the touch panel module 52 notifies the micon 51 of positional information of a touched portion via a touch panel communication bus 62. The operating portion 50 is capable of causing the liquid crystal module 54 to display software keys and the user is capable of inputting information by contact with the touch panel module 52. That is, the operating portion 50 is a touch panel capable of inputting information by displaying the software keys. The touch panel module 52 is constituted by a touch panel device and a touch panel device controller. As a touch panel device, those of any types such as a resistive film type, an electrostatic capacity type, and an optical type of infrared radiation or the like may also be applied.

The data converter 53 is a module which receives the image data from the operating portion IN/output circuit 35 of the controller 30 via the bus 61 and which then converts the image data into data format which is capable of being received by the liquid crystal module 54. For example, from the controller 30, the data converter 53 receives data of standards such as Display Port and HDMI (registered trademark) and converts the data into LVDS and signal format of a CMOS level which are capable of being received by the liquid crystal module 54, and then inputs the converted data to the liquid crystal module 54 via a bus 63. Further, the data converter 53 is connected to the micon 51 by a bus 64, and also has a function of overwriting the image data sent from the controller 30 with the image data generated by the micon 51 at a predetermined position.

The liquid crystal module 54 is a module constituted by an LCD and a backlight module, and receives data from the data converter 53 via the bus 63 and then transfers the image data to the LCD at a timing determined in advance. At this time, by causing the backlight module to emit light, the image data transferred to the LCD is displayed as a visible image. Adjustment of brightness of the back light is performed by operating switches 55 and 56 dedicated for brightness adjustment accompanying the operating portion 50.

When the switch 55 is pressed down one time by the user, the micon 51 sends a command of setting for brightening the brightness by one level toward the book light module in the liquid crystal module 54 via a bus 65. The back light module receiving the command, from the micon 51, for brightening the brightness by one level increases a value of a current corresponding to an amount determined in advance and then supplies the current to the LED device in the back light.

When the switch 56 is pressed down one time by the user, the micon 51 sends a command of setting for darkening the brightness by one level toward the back light module in the liquid crystal module 54 via the bus 65. The back light module receiving the command, from the micon 51, for darkening the brightness by one level decreases a value, of a current corresponding to an amount determined in advance, from a value of a current supplied at present, and then supplies the current to the LED device in the back light.

As shown in FIG. 1, the operating portion 50 is provided on a front side F than a central portion of the image forming apparatus 1 with respect to a front-rear direction and is provided above a front cover 10a which is a part of an outer casing cover of the apparatus main assembly 10. The operating portion 50 is formed in, for example, a rectangular flat plate shape, and is fixedly provided to the apparatus main assembly 10 with a panel surface 57, toward an upper side U, constituted by laminating the touch panel module 52 on the liquid crystal module 54 (see FIG. 2). Incidentally, the shape of the operating portion 50 is not limited to the rectangular flat plate shape, but may also be another shape. Further, a direction of the touch panel module 52 and the liquid crystal module 54 is not limited to the upper side U, but may also be another direction, and for example, these modules may also be provided so as to be tiltable in an up-down direction relative to the apparatus main assembly 10 and so that the direction of the touch panel module 52 and the liquid crystal module 54 is changeable.

<Numerical Key (Ten Key) Unit>

Next, a hardware constitution and an operation of the numerical key unit 70 which is an input device connected to the image forming apparatus 1 will be described. This numerical key unit 70 is mountable to the image forming apparatus 1 including the operating portion 50 capable of inputting information, and is capable of inputting information to the image forming apparatus 1 separately from the operating portion 50. As an example of different uses for different purposes in information input between the operating portion 50 and the numerical key unit 70, setting of a density, a size, and the like relating to image formation is inputted from the operating portion 50, and numerical values such as the number of image-formed sheets and a designation number of a facsimile are inputted from the numerical key unit 70. Incidentally, in the present specification, the numerical key is a concept including either of the case where the numerical key shows 10 numerical keys from 0 to 9, the case where the numerical key shows 12 keys in which "*" and "#" are added to the (10) numerical keys, and the case where the numerical key shows about 20 keys in which numerical keys include four arithmetic operators, a "Num-Lock", and the like.

Figure 3:
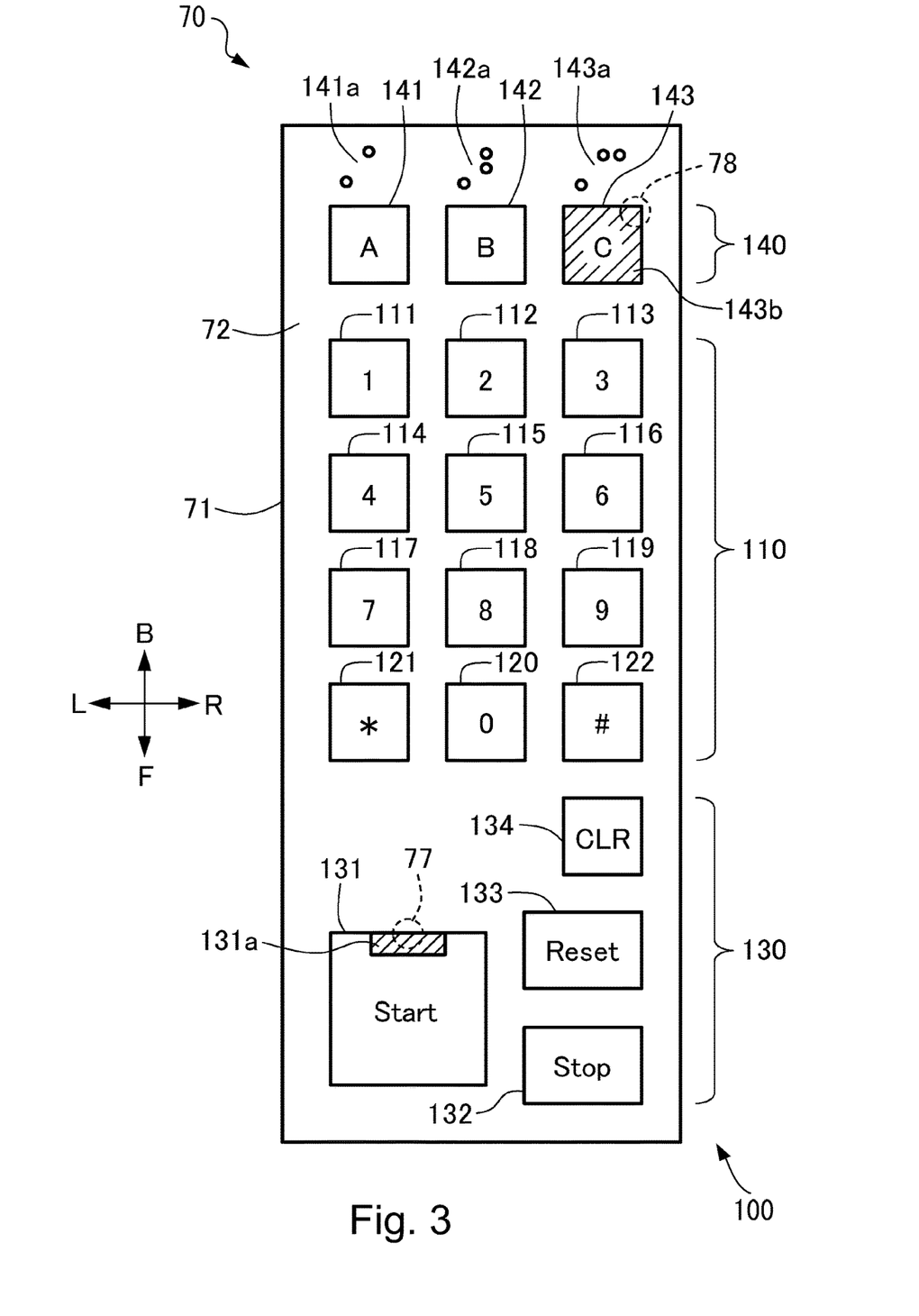
FIG. 3 is a (top) plan view of a numerical key unit of the image forming apparatus according to this embodiment.

As shown in FIG. 1 and FIG. 3, the numerical key unit 70 includes a casing 71, an upper cover 72 provided on an upper surface of the casing 71, and operation keys 100 provided on the upper cover 72. An arrangement of the operation key 100 will be described later. As shown in FIG. 1, the casing 71 is adjacent to a right side of the operating portion 50 of the image forming apparatus 1 and is mounted, for example, by screwing or bonding, on the installation surface 12 facing the upper side U on a right side R in a front side R of the apparatus main assembly 10. By this, the user can easily use the numerical key unit 70 by utilizing a right hand while looking at the operating portion 50.

Figure 4:
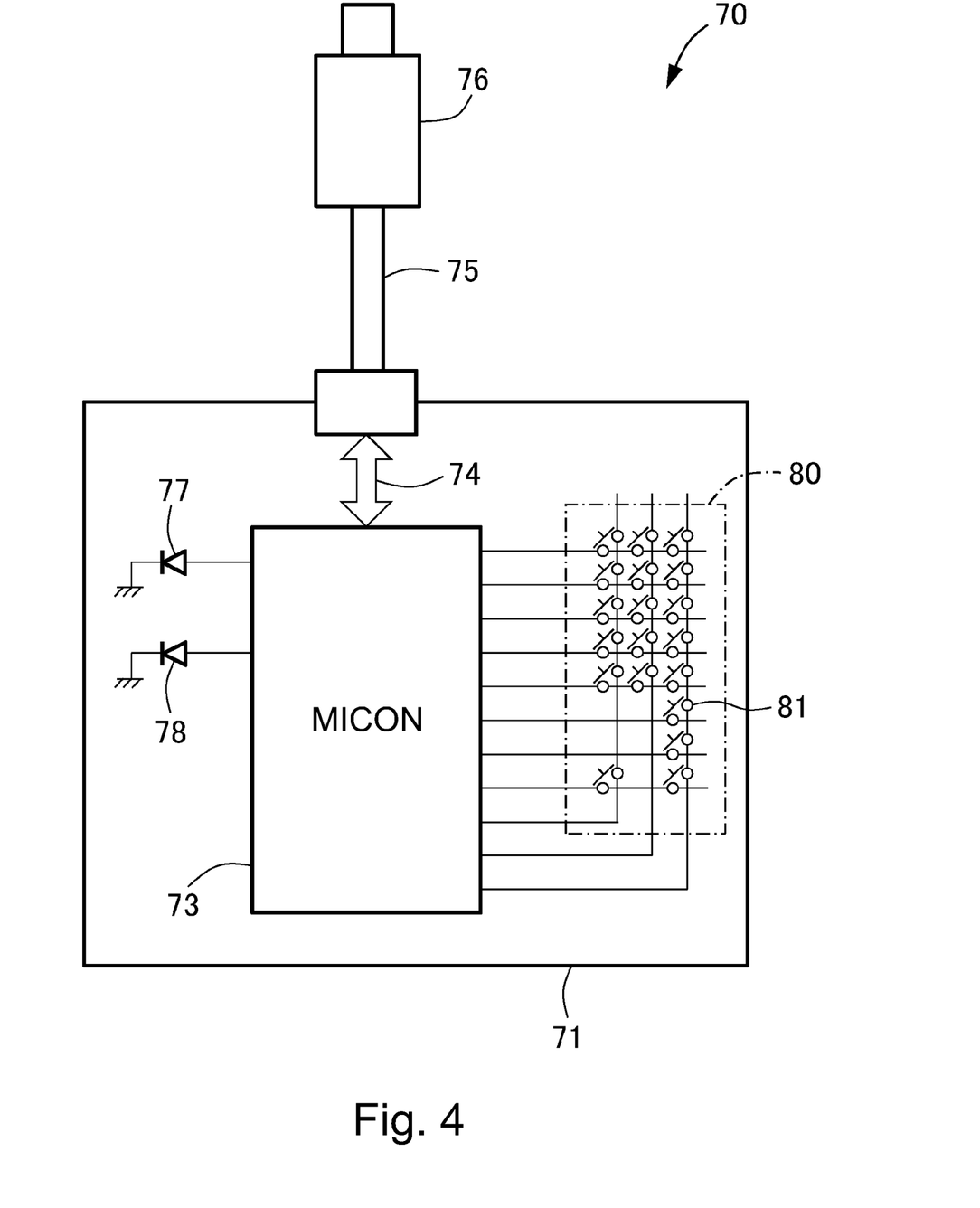
FIG. 4 is a plan view of the numerical key unit of the image forming apparatus according to this embodiment.

As shown in FIG. 4, the numerical key unit 70 includes a hardware key unit 80, a micon 73, an inner bus 74, a connecting cable (connecting portion) 75, a terminal 76 provided at a free end of the connecting cable 75, and LEDs 77 and 78. In this embodiment, for example, the inner bus 74 is a USB, the connecting cable 75 is a USB cable provided from the casing 71 to an outside, and the terminal 76 is a USB terminal. By this, the image forming apparatus 1 and the numerical key unit 70 are electrically connected to each other via the connecting cable 75. That is, the connecting cable 75 is USB-connected to the image forming apparatus 1. Incidentally, in this embodiment, the connecting cable 75 has a constitution in which the connecting cable 75 is connected to a connector fixed to a substrate and cannot be dismounted from the numerical key unit 70. However, a mounting structure of the connecting cable 75 to the numerical key unit 70 is not limited thereto, and for example, the numerical key unit 70 is provided with a USB port connected to the inner bus 74, and the USB cable may also be connected to this USB port so as to be mounted in and dismountable from the USB port. Or, the USB cable is provided from the image forming apparatus 1 side, and a terminal of this USB cable may also be connected to the USB port connected to the inner bus 74 of the numerical key unit 70 so as to be mountable in and dismountable from the USB port.

The hardware key unit 80 includes a plurality of hardware keys. In this embodiment, in order to provide operation feeding (for example, click feeling) of an operation key 100 to the user, as an example of the numerical keys, tactile switches 81 are supplied. The tactile switches 81 are disposed one by one at positions opposing the operation keys 100 (see FIG. 3), respectively, on an inside of the casing 71. The tactile switch 81 is constituted by, for example, a protective cover, a plunger pushed by the operation key 100, a reversing spring not only creating the click feeling but also functioning as a movable contact, and a base portion including two contacts. Incidentally, as the tactile switch 81, an existing or new appropriate constitution can be applied, and thus will be omitted from detailed description.

The micon 73 is capable of executing, for example, detection of input from the numerical key unit 80, lighting control of the plurality of LEDs 77 and 78, and USB communication between the micon 73 and the CPU 31 of the image forming apparatus 1 via the external input/output circuit 40. The terminal 76 is connected to the connector 40a (see FIG. 2) which is the USB connector of the external input/output circuit 40 of the apparatus main assembly 10. By this, the micon 73 and the controller 30 are USB-connected to each other via the connecting cable 75, and thus are capable of communicating with each other through an HID protocol for USB.

The micon 73 specified the tactile switch 81 pushed down and generates a code determined in advance in the case where the tactile switch 81 is pushed down by the user. The micon 73 sends the generated key code to the CPU 31 of the image forming apparatus 1 via the inner bus 74 and the connecting cable 75. The CPU 31 performs processing depending on the key inputted.

A first LED (start light emitting portion) 77 is provided on a back side of a start key 131 (see FIG. 3) described later in the casing 71, and emits light by the micon 73 on the basis of a signal from the controller 30 (see FIG. 2). That is, the start key 131 includes the first LED 77 capable of emitting the light by the signal from the image forming apparatus 1. The controller 30 causes the first LED 77 to emit light in the case where the image forming portion 22 (see FIG. 1) is in an image formable state, and turns off the first LED 77 in the case where the image forming portion 22 is not in the image formable state. Further, as needed, the first LED 77 may also be blinked, and a color of light emitted is changed and thus may also show a state.

A second LED (setting light emitting portion) 78 is provided on a back side of a third setting key 143 (see FIG. 3) described later in the casing 71, and emit light by the micon 73 on the basis of a signal from the controller 30 (see FIG. 2). That is, the third setting key 143 includes the second LED 78 capable of emitting the signal from the image forming apparatus 1. The controller 30 causes the second LED 78 to emit light in the case where a mode of the image forming apparatus 1 is a predetermined mode, for example, a voice input mode, and turns off the second LED 78 in the case where the mode of the image forming apparatus 1 is not the predetermined mode. Further, as needed, the second LED 78 may also be blanked.

Next, an arrangement of the operation keys 100 of the numerical key unit 70 will be described using FIG. 3. Here, FIG. 3 illustrates the numerical key unit 70 as viewed from a front side and is a diagram of the numerical key unit 70 viewed from a direction parallel to a pushing (pressing)-down direction of each of the numerical keys. The operation keys 100 roughly includes a numerical key portion (numerical value key portion) 110, an operation key portion 130, and a setting key portion 140.

The numerical key portion 110 includes a plurality of hardware keys capable of inputting information on at least numerical values by being pushed down. In this embodiment, the numerical key portion 110 includes numerical (value) keys 111 to 120 for inputting numerical values of 0 to 9, a key 121 for inputting "*", and a key 122 for inputting "#". By an operation of the numerical keys 111 to 120, input of the number of copied sheets and a telephone number of a facsimile, or the like can be carried out. Incidentally, the numerical key 115 for inputting the numerical value of 5 is provided with a small projected portion on an upper surface thereof. By this, the user is capable of discriminating the numerical key 115 by a tactile sense without looking at the key, so that blind input of peripheral numerical keys 111 to 120 can be realized without directly looking at the keys.

Here, the numerical key unit 70 in this embodiment a dedicated numerical key unit 70 designed, for the image forming apparatus 1, as one of options of the image forming apparatus 1. Uses of this dedicated numerical key unit 70 are principally, for example, input of a designation number (FAX number) when facsimile transmission is made. The dedicated numerical key unit 70 is designed for principal purpose of inputting the designation number of the facsimile transmission, and therefore, an arrangement of the numerical key portion 110 is similar to an arrangement of a telephone. That is, the arrangement of the numerical key portion 110 of the numerical key unit 70 is similar to a standard arrangement shown in Recommendation E.161 of ITU-T (International Telecommunication Union-Telecommunication Standardization Sector). That is, as shown in FIG. 3, in the numerical key portion 110, the numerical keys 111 to 119 from 1 to 9 are adjacently disposed so that a rearmost side B includes 1 to 3, a front side F thereof includes 4 to 6 and a further front side F thereof includes 7 to 9 and so that the "*" key 121 and the "#" 122 are disposed on left and right sides (of the "0" key).

In other words, with respect to the 10 hardware keys from 0 to 9, a row of the numerical keys of 1, 2 and 3 is disposed on the rearmost side, and a row of the numerical keys of 4, 5 and 6 is disposed on a side in front of the row of 1, 2 and 3. Further, a row of the numerical keys of 7, 8 and 9 is disposed on a side in front of the row of the numerical keys 4, 5 and 6. Further, the hardware key of 0 is disposed on a side in front of the row of the hardware keys of 7, 8 and 9. Further, when these numerical keys from 0 to 9 are viewed in column, from a left(-hand) side, these numerical keys are arranged in the order of a column of the numerical keys 1, 4 and 7, a column of the hardware keys 2, 5, 8 and 0, and a column of the numerical keys 3, 6 and 9. That is, the numerical keys of 1 to 9 are aligned and arranged in a matrix of 3×3 in the case where the numerical key unit 70 is viewed from the front side, so that from an upper stage in a column direction, the numerical keys of 1 to 3, the numerical keys of 4 to 6, and the numerical keys of 7 to 9 are sequentially disposed and so that the numerical key of 0 is disposed on a further lower stage than the row of the numerical keys of 7 to 9. Incidentally, the numerical key of 0 may also be disposed in the column of the numerical keys of 1, 4 and 7 or in the column of the hardware keys of 3, 6 and 9, and the arrangement of the "*" key and the "#" key may appropriately be changed. Further, in this numerical key unit 70, electronic calculator input is not a principal purpose, and therefore, four arithmetic operators such as +, -, ×, /, and the like are not provided. Thus, this numerical key unit 70 is not designed for the purpose of being connected to a PC, and therefore, is different in key arrangement from a general-purpose numerical key unit connectable to unspecified PCs and so on.

Here, the key arrangement of the general-purpose numerical key unit is the same as principally the key arrangement of the electronic calculator. That is, in the general-purpose numerical key unit, with respect to the 10 hardware keys from 0 to 9, a row of the numerical keys of 7, 8 and 9 is disposed on the rearmost side, and a row of the numerical keys of 4, 5 and 6 is disposed on a side in front of the row of 7, 8 and 9. Further, a row of the numerical keys of 1, 2 and 3 is disposed on a side in front of the row of the numerical keys 4, 5 and 6. Further, the hardware keys of 0 and 00 is disposed on a side in front of the row of the hardware keys of 1, 2 and 3. That is, arrangement of the numerical keys in the general-purpose numerical key unit is similar to the arrangement defined in ISO (International Standards Organization). Further, when these numerical keys from 1 to 9 are viewed in column, from a left(-hand) side, these numerical keys are arranged in the order of a column of the numerical keys 1, 4 and 7, a column of the hardware keys 2, 5 and 8, and a column of the numerical keys 3, 6 and 9. The hardware keys of 0 and 00 are disposed so as to bridge over the column of the numerical keys of 1, 4 and 7 and the column of the numerical keys of 2, 5 and 8, or are disposed in the same row as the row of 1, 4 and 7. Further, on a right(-hand) side and on a rear side of the numerical keys, four arithmetic operators such as +, -, ×, /, a functional key portions, and the like are disposed. Thus, the numerical key unit 70 in this embodiment and the general-purpose numerical key unit are different from each other in numerical key arrangement, function key, and the like provided therein.

Further, the keys 121 and 122 are keys effective in the case where the image forming apparatus 1 is in a FAX mode. For example, in the case where the image forming apparatus 1 is in the FAX mode, the user operates the keys 121 and 122, whereby pieces of information of "*" and "#" are sent to the controller 30.

The operation key portion 130 includes a start key 131, a stop key 132, a reset key 133, and a clear key 134, and all the keys are disposed on the front side F of the numerical key portion 110. The start key 131 is comprised of a hardware key capable of inputting information for starting predetermined processing. Here, the predetermined processing is, for example, copy processing of the image forming apparatus 1 or transmission processing of the facsimile, or the like, and these pieces of processing can be started by pushing down the start key 131. That is, the controller 30 controls the image forming portion 22 depending on an operation of the start key 131 and starts the image forming operation. Or, the controller controls the modem 37 depending on the operation of the start key 131 and starts the transmission of the facsimile.

The start key 131 is disposed on a side in front of the numerical key portion 110 in a state in which the casing 71 is mounted in the image forming apparatus 1. That is, the start key 131 is disposed on the front side of the numerical keys of 111 to 120 relative to the user performing the operation. Further, the start key 131 is larger than the keys 111 to 122, which are hardware keys of the numerical key portion 110, as viewed from a pushing-down direction, and is largest key in the numerical key unit 70. By this, the user can easily push down the start key 131, so that an operating property can be improved compared with the case where the start key 131 has a size equal to a size of each of the keys 111 to 122. Further, the start key 131 is disposed within a range between an end portion of the numerical key portion 110 on the left side L and an end portion of the numerical key portion 110 on the right side R as viewed from the front side F. Further, as viewed from the front side F, within the range between the left side L end portion and the right side R end portion of the numerical key portion 110, the start key 131 is disposed on a side close to the operating portion 50, i.e., on the left side L.

In this embodiment, the start key 131 is provided with a (light) transmission portion 131a at a part of the rear (back) side B thereof. The transmission portion 131a is comprised of a plastic member having a (light) transmission property, and is integrated with another portion of the start key 131. Inside the transmission portion 131a, the first LED 77 is provided. Incidentally, the first LED 77 is provided on a down side D of the transmission 131a with respect to a vertical direction and inside the casing 71 when the numerical key unit 70 is mounted on the installation surface 12. For this reason, in the case where the image forming portion 22 (see FIG. 1) is in the image formable state, when the controller 30 causes the first LED 77 to emit light, the light from the first LED 77 passes through the transmission portion 131a and becomes recognizable by the user. B this, the user is capable of confirming whether or not the image forming portion 22 is in the image formable state, by looking at the numerical key unit 70 without looking at the operating portion 50 so that the operating property can be improved.

Figure 5:
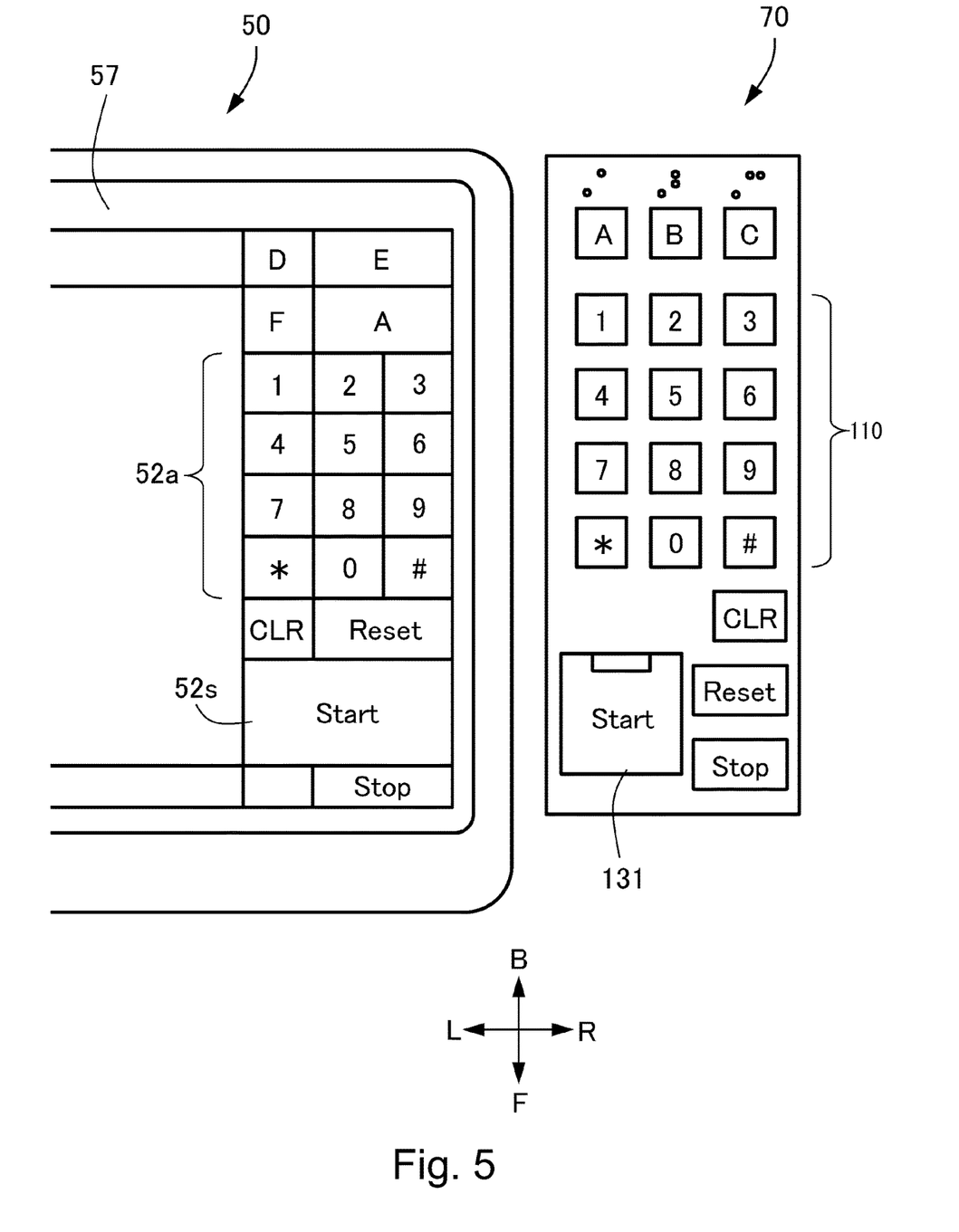
FIG. 5 is a plan view of the numerical key unit and a main assembly operating portion of the image forming apparatus according to this embodiment.

Here, as shown in FIG. 5, on a panel surface 57 of the operating portion 50, software numerical key portion (software numerical value portion) 52a and a software start key 52s are displayed. The software numerical key portion 52a is comprised of software keys capable of inputting information on at least numerical values. The software start key 52s is comprised of software keys capable of inputting information for starting predetermined processing. The software numerical key portion 52a has a function similar to the function of the numerical key portion 110 of the numerical key unit 70, and the software start key 52a has a function similar to the function of the start key 131 of the numerical key unit 70. In this embodiment, the start key 131 is positioned on the right side R relative to the software start key 52a displayed on the panel surface 57 as viewed from the front side F in a state in which the casing 71 is mounted in the image forming apparatus 1. That is, the start key 131 is disposed so as to be adjacent to the software start key 52s in the left-right direction of the casing 71. By this, commonality of operation can be achieved between the software start key 52a and the start key 131, so that even in the case where any key is used, the operating property can be improved with no sense of incongruity.

Further, also in the software keys displayed on the panel surface, similarly as in the key arrangement of the numerical key unit 70, the software start key 52s is disposed in front of the software numerical key portion 52a. That is, either of the software keys displayed on the panel surface 57 and the numerical key unit 70 is disposed such that the numerical key portion is on the rear (back) side B and the start key is on the front side F. The arrangement of the software numerical key portion 52a and the software start key 52s which are displayed on the panel surface 57 is the same as the arrangement of the numerical key portion 110 and the start key 131 of the numerical key unit 70. That is, the arrangement of the software numerical key portion 52a is similar to the arrangement of the numerical key portion of the telephone similarly as the arrangement of the numerical key portion 110. Further, as shown in FIG. 5, in the case where the panel surface 57 is viewed from the front side, keys of 1 to 9 are aligned and arranged in matrix of 3×3, and from an upper stage in a column direction, numerical keys of 1 to 3 numerical keys of 4 to 6, and numerical keys of 7 to 9 are disposed sequentially, and a numerical key of 0 is disposed on a further lower stage than a row of the numerical keys of 7 to 9. Thus, by making a positional relationship between the numerical key portion and the start key with respect to the front-rear direction the same, a sense of incongruity becomes the same between the case where these keys are operated from the software keys and the case where these keys are operated from the numerical key unit 70, so that the operating property can be improved. Incidentally, in the case where arrangements of the software keys displayed on the panel surface 57 and the numerical key portion of the numerical key unit 70 and the start key are different, for example, in the case where the start key is positioned on the right side R of the numerical key portion in the numerical key unit as in Patent Document 1, the operating property is poor. This is because an operating method varies between the case where the keys are operated from the software keys and the case where the keys are operated from the numerical key unit 70.

As shown in FIG. 3, the stop key 132 is a hardware key capable of inputting information for stopping the predetermined processing started by the start key 131. The stop key 132 is disposed not only on the front side F than the numerical key portion 110 but also on the right side R than the start key 131 in the state in which the casing 71 is mounted on the image forming apparatus 1. Further, the stop key 132 is provided so as to be larger than each of the keys of 111 to 122 which are hardware keys of the numerical key portion 110 as viewed from the pushing-down direction. By this, the user is capable of easily pushing down the stop key 132, so that the operating property can be improved compared with the case where the stop key 132 has the same size as each of the keys of 111 to 122.

The reset key 133 is a hardware key capable of inputting information for resetting the setting inputted to the image forming apparatus 1 and is a key for returning the setting of the image forming apparatus 1 set by the user. The reset key 133 is disposed on the front side F than the numerical key portion 110 in the state in which the casing 71 is mounted on the image forming apparatus 1. The cleaner key 134 is a hardware key capable of inputting information for clearing a numerical value inputted to the image forming apparatus 1 by the numerical key portion 110, and is a key for cancelling the numerical values inputted to the image forming apparatus 1 by the numerical keys of 111 to 120. The clear key 134 is disposed on the front side F than the numerical key portion 110 in the state in which the casing 71 is mounted on the image forming apparatus 1.

The setting key portion 140 includes, in this embodiment, three keys consisting of a first setting key 141, a second setting key 142, and a third setting key 143, and each of these keys is comprised of a numerical key capable of inputting information for setting a predetermined mode of the image forming apparatus 1. Each of the respective setting keys 141 to 143 is disposed on the back side (rear side) B in the state in which the casing 71 is mounted on the image forming apparatus 1. Each of the setting keys 141 to 143 is a key for setting a mode and a function which are determined in advance for the image forming apparatus 1. In the case where the user pushes down either one of the setting keys 141 to 143, depending on the setting key pushed down, the micon 73 sends a code determined in advance, to the controller 30, and the controller 30 sets various modes settings, of the image forming apparatus 1, determined in advance.

In this embodiment, entirety of the third setting key 143 is a (light) transmission portion 143b. The transmission portion 143b is a plastic micon having a (light) transmission property. Inside the transmission portion 143b, the second LED 78 is provided. For this reason, in the case where the image forming portion 22 (see FIG. 1) is in a predetermined mode, for example in a voice input mode, when the controller 30 causes the second LED 78 to emit light, the light from the second LED 78 passes through the transmission portion 143b and becomes recognizable by the user. By this, the user is capable of confirming whether or not the image forming apparatus 1 is in the voice input mode, by looking at the numerical key unit 70 without looking at the operating portion 50, so that the operating property can be improved.

Further, as regards the respective setting keys 141 to 143, at positions adjacent to the respective setting keys 141 to 143, for example, on the rear (back) side B of the respective setting keys 141 to 143, braille (characters) 141a to 143a indicating pieces of information on the setting keys 141 to 143, respectively, are displayed. The braille 141a is braille for the first setting key 141, and in this embodiment, a function of the first setting key 141 is "A", so that the braille meaning a capital A is provided. The braille 142a is braille for the second setting key 142, and in this embodiment, a function of the second setting key 142 is "B", so that the braille meaning a capital B is provided. The braille 143a is braille for the third setting key 143. In this embodiment, a function of the third setting key 143 is "C", so that the braille meaning a capital C is provided.

Further, for example, in the case where the function of the first setting key 141 is constituted by a plurality of characters of, for example, "DEF", only "D" which is a start (leading) one character of the function is constituted by braille. Or, even in the case of a character other than the start one character, one character representing the plurality of characters may also be constituted by the braille. Even the cases of the second setting key 142 and the third setting key 143 are the same. That is, in this embodiment, each of the braille (characters) 141a to 143a is one (single) character indicating information on associated one of the setting keys 141 to 143. By limiting the braille displayed, to the one character, compared with the case where the plurality of characters are displayed, it is possible to prevent that the upper surface of the numerical key unit 70 is a mess and thus to make reading of the braille easy.

As described above, according to the image forming apparatus 1 of the present invention, the numerical key unit 70 is mounted so that the start key 131 capable of inputting the information for starting the copying or the predetermined processing such as the facsimile transmission is disposed on the front side F than the numerical key portion 110. By this, in the case where the start key 131 is pushed down immediately after the input to the numerical key portion 110, a finger (or fingers) can be easily extended compared with the case where the start key 131 is positioned relative to the numerical key portion 110 with respect to the left-right direction. For this reason, in the numerical key unit 70 for external attachment including the numerical key portion 110 and the start key 131 which are comprised of the hardware keys, the operating property can be improved.

Further, according to the image forming apparatus 1 of this embodiment, the numerical key portion 110 and the start key 131 are disposed and arranged in the front-rear direction of the numerical key unit 70. For this reason, when the user performs an operation while looking at the panel surface 57, both the keys of the numerical key portion 110 and the start key 131 easily come together with the panel surface 57 within sight of the user. For this reason, when the user performs the operation while looking at display of the panel surface 57, both the keys of the numerical key portion 110 and the start key 131 easily comes together with the panel surface within sight of the user, so that the operating property can be improved. Here, the operating portion 50 is provided on the front right side of the apparatus main assembly 10 in relatively many cases. In the case where the numerical key unit 70 is an option, from the viewpoint of the operating property, the numerical key unit 70 is attached to a further right side R of the operating portion 50, and if a constitution in which the numerical key portion 110 and the start key 131 are arranged in the left-right direction is employed, a width of the numerical key unit 70 becomes large. For that reason, a space for permitting mounting of the option with respect to the left-right direction is needed, so that an occupied area of the image forming apparatus 1 becomes large. Or, when a space in which the operating portion 50 is shifted to the left side L and the option is mounted is ensured, viewability of the sheet discharging portion 23 is worsened by the operating portion 50. Thus, according to the image forming apparatus 1 of this embodiment, by arranging the numerical key portion 110 and the start key 131 in the front-rear direction, a size of the numerical key unit 70 with respect to the left-right direction can be made smaller than a constitution in which these keys are arranged in the left-right direction.

Incidentally, in the above-described embodiment, the case where the start key 131 and the third setting key 143 are provided with the LEDs 77 and 78 was described, but the present invention is not limited thereto. For example, other keys 141 and 142 may be provided with LEDs, or the numerical keys 111 to 120 may also be provided with LEDs.

INDUSTRIAL APPLICABILITY

According to the present invention, the input device and the image forming apparatus which are capable of improving the operating property in the input device for external attachment including the numerical value key portion and the start key which are comprised of the hardware keys are provided.

The present invention is not restricted to the foregoing embodiment, but can be variously changed and modified without departing from the spirit and the scope of the present invention. Accordingly, the following claims are attached hereto to make public the scope of the present invention.

This application claims the Conventional Priority from Japanese Patent Application 2019-018766 filed Feb. 5, 2019, all disclosure of which is incorporated by reference herein.

The invention claimed is:

1. An image forming apparatus comprising:
an image reading device configured to read an image of an original;
an image forming portion configured to form the image on a recording medium on the basis of a reading result of the image reading device;
an operating panel which includes a display screen configured to display a software numerical key portion where a plurality of software numerical keys configured to input numerical information of 0 to 9 are arranged in a telephone type arrangement, a software execution key configured to provide an instruction of a start of reading the image to the image reading device, and a software stop key configured to provide an instruction of a stop of reading the image to the image reading device; and
an input device mountable in and dismountable from the image forming apparatus as an option device, the input device comprising:
a numerical key portion where a plurality of numerical keys configured to input numerical information of 0 to 9 are arranged as hardware keys in the telephone type arrangement;
an execution key which is used as a hardware key configured to provide an instruction of a start of reading the image to the image reading device; and
a stop key, which is used as a hardware key, configured to provide an instruction of a stop of reading the image to the image reading device,
wherein a length of a casing of the input device in a front-back direction is longer than a length of the casing of the input device in a left-right direction,
wherein the execution key and the stop key are provided on a position to overlap with an area where said numerical key portion is provided in the front-back direction, and is provided on the front side with respect to the numerical key portion in the front-back direction, and
wherein the software execution key and the software stop key are provided on the front side with respect to the software numerical key portion in the front-back direction.

2. An image forming apparatus according to claim 1, wherein the execution key is larger than the hardware key of the numerical key portion in the case that said input device is viewed from the front side.

3. An image forming apparatus according to claim 1, wherein the execution key includes a start light emitting portion configured to emit light by a signal from the image forming apparatus.

4. An image forming apparatus according to claim 1, wherein the stop key is larger than the hardware key of the numerical key portion in the case that the input device is viewed from the front side.

5. An image forming apparatus according to claim 1, wherein the stop key is disposed adjacent to the start key in the case that the input device is viewed from the front side.

6. An image forming apparatus according to claim 1, wherein the input device comprises a setting key comprised of a hardware key configured to input information for setting an input mode of the image forming apparatus at a voice input mode, and wherein in the case that the input device is viewed from the front side, braille indicating information on the setting key is provided at a position adjacent to the setting key.

7. An image forming apparatus according to claim 6, wherein the setting key is the hardware key for setting a mode related to a voice.

8. An image forming apparatus according to claim 6, wherein the setting key includes a setting light emitting portion configured to emit light by a signal from the image forming apparatus.

9. An image forming apparatus according to claim 1, wherein the input device comprises a reset key, as a hardware key for providing an instruction of a reset of a setting input to the image forming apparatus,
wherein in the case that the input device is viewed from the front side, said reset key is provided on a position to overlap with the area where said numerical key portion is provided with respect to the first front-back direction.

10. An image forming apparatus according to claim 9, wherein the reset key is provided on the front side with respect to the numerical key portion in the first front-back direction.

11. An image forming apparatus according to claim 1, wherein the input device comprises a clear key, as a hardware key configured to provide an instruction of a clear of a numerical value inputted to the image forming apparatus by the numerical key portion,
wherein said clear key is provided on a position to overlap with the area where said numerical key portion is provided with respect to the front-back direction.

12. An image forming apparatus according to claim 11, wherein the clear key is provided on the front side with respect to the numerical key portion in the front-back direction.

13. An image forming apparatus according to claim 1, further comprising a facsimile communication portion configured to transmit and receive facsimile,
wherein the facsimile communication portion starts transmission of facsimile of image data read by the image reading device in response to pushing-down of the execution key.

14. An image forming apparatus according to claim 1, wherein the operating panel is provided on a right side with respect to a center of said image forming apparatus in the left-right direction of said image forming apparatus, and
wherein said input device is provided on a right side with respect to said operating panel with respect to the left-right direction.

15. An image forming apparatus according to claim 1, further comprising a discharging portion for discharging the recording medium on which the image has been formed by said image forming portion,
wherein said operating panel is provided above said discharging portion in a vertical direction.

16. An image forming apparatus according to claim 1, wherein the input device comprises:
the stop key being provided on the front side with respect to the numerical key portion in the front-back direction, and
a reset key, as a hardware key configured to provide an instruction of a reset of a setting input to the image forming apparatus, the reset key being provided on the front side with respect to said numerical key portion in the front-back direction,
wherein the execution key, the stop key and the reset key are provided in a region where the numerical key portion is provided in the front-back direction in the case that the input device is viewed from the front side.

17. An image forming apparatus according to claim 1, wherein the input device comprises:
the stop key being provided on the front side with respect to the numerical key portion in the front-back direction, and
a clear key, as a hardware key configured to provide an instruction of a clear of a numerical value inputted to the image forming apparatus by the numerical key portion, the clear key being provided on the front side with respect to said numerical key portion in the front-back direction,
wherein said execution key, the stop key and the clear key are provided in a region where the numerical key portion is provided in the front-back direction in the case that the input device is viewed from the front side.

18. An image forming apparatus according to claim 1, wherein a function key is configured to provide an instruction of function of the image forming apparatus.

* * * * *